UNITED STATES PATENT OFFICE.

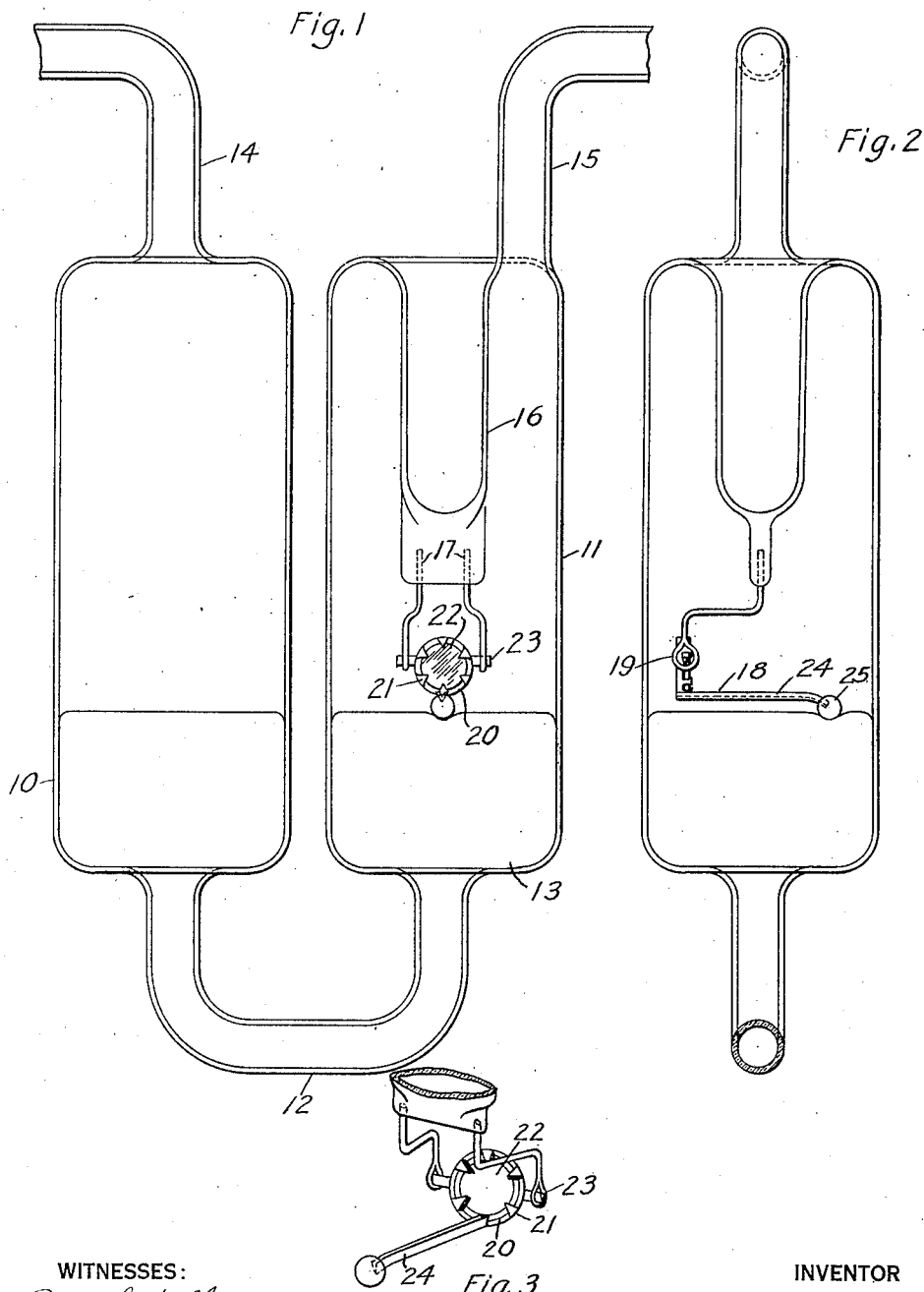

JAMES E. SHRADER, OF EDGEWOOD, PENNSYLVANIA, ASSIGNOR TO WESTINGHOUSE ELECTRIC AND MANUFACTURING COMPANY, A CORPORATION OF PENNSYLVANIA.

MERCURY-MANOMETER.

1,346,428.   Specification of Letters Patent.   Patented July 13, 1920.

Application filed December 27, 1917. Serial No. 209,196.

*To all whom it may concern:*

Be it known that I, JAMES E. SHRADER, a citizen of the United States, and a resident of Edgewood, in the county of Allegheny and State of Pennsylvania, have invented a new and useful Improvement in Mercury-Manometers, of which the following is a specification.

My invention relates to new and useful improvements in devices for measuring gases and vapors at low pressures and more particularly to an improved form of mercury manometer.

With the various types of mercury manometers now in use, it is difficult to accurately and quickly determine slight changes in pressure and almost impossible to correctly follow continuous changes in pressure.

One of the primary objects of my present invention resides in overcoming these defects by providing the manometer with an optical lever so that the changes in pressure may be readily read by the projection of light rays reflected upon a suitable scale. This not only renders the gage or manometer more sensitive and easily read, but also permits ready following of continuous changes in pressure and permits recording of such changes, if desired, by a suitably moving photographic arrangement.

A further object of my invention is to mount the optical lever entirely within the manometer so that it is protected from displacement or injury.

With these and other objects in view, my invention will be more fully described, illustrated in the drawings, and then particularly pointed out in the claims.

In the drawings, Figure 1 is a front elevation of my improved mercury manometer; Fig. 2 is a vertical sectional view, taken on the line II—II of Fig. 1; and Fig. 3 is a perspective view of the optical lever forming the main feature of my invention.

Corresponding and like parts are referred to in the following description and indicated in all the views of the drawings by the same reference characters.

My improved manometer, with the exception of the optical lever, is preferably constructed wholly of glass and includes a pair of pressure chambers 10 and 11 connected, at their lower ends, by a U-tube 12, the dimensions of the chambers and tube being of no practical importance so long as their internal diameters are such as to prevent any capilliary action of the mercury 13 contained in the chambers and tube. A tube 14 leads from the upper end of the chamber 10, while a tube 15 leads from the upper end of the chamber 11, these tubes being adapted to be sealed or otherwise connected to the remainder of the apparatus employed in the measuring of gas pressures, one of the tubes being connected to the portion of the system containing an absolute or Torricellian vacuum, and the other being connected to the portion of the system containing the gas or vapor, the pressure of which is to be measured.

Sealed into the top of the chamber 11 and depending axially therein, is a tube 16, and sealed into the lower end of this tube are supporting or leading-in wires 17 which carry the optical lever indicated, as a whole, by the numeral 18. These leading-in wires 17 are bent rearwardly away from each other and downwardly, and their terminals are bent to form pivot eyes 19 opposed to each other and vertically disposed in a common horizontal plane.

The optical lever 18 includes a substantially circular-shaped body portion 20, preferably formed of light sheet iron or other material not affected by mercury, the body, about its periphery, being provided with projecting tongues 21 which are bent forwardly and inwardly over the edge of a circular mirror 22 mounted against the forward face of the body 20. The body 20 is further provided, at diametrically opposite points, with radially-extending tongues 23 which are doubled upon themselves longitudinally and have their folded portions beveled to form knife edges for engagement with the eyes 19 through which the tongues project. By this means, a delicate pivoting of the body of the optical lever is assured. At its lower edge, and midway between the tongues 23, the body 20 is provided with a further projection or tongue, doubled upon itself longitudinally to increase its stiffness, constituting the lever proper 24. The free end of the lever 24 is curved downwardly somewhat and carries a small bead or float 25 of fused glass or other material not affected by mercury.

From the foregoing description of my improved manometer, taken in connection with the drawings, its operation will be readily understood. The mercury surface in one of the chambers being, at all times, exposed to absolute vacuum, while the mercury surface in the other chamber is exposed to the pressure of the gas or vapor being measured, it will be apparent that the mercury levels in the two chambers will vary as the pressure of the gas or vapor being measured varies. As a result of this variation in mercury levels in the two chambers, the optical lever 18 will be swung, and light rays cast upon its mirror may be reflected upon a suitably disposed and inscribed scale. On account of the length of the lever arm 24, the extent of change in level of the mercury surface is multiplied during its transmission to the mirror and is still further and greatly multiplied by the reflection of light rays from the mirror to the scale. Because of this, the sensibility of the manometer is greatly increased, and even extremely slight changes in pressure may be easily and quickly noted. Obviously, either arm of the manometer may be connected to the vacuum chamber and the other to the chamber in which the pressure is being measured.

As a matter of fact, a mercury manometer constructed in accordance with this invention has been thoroughly tested and found to have a range between 2 millimeters and .001 millimeter with a sensibility of about .0003 millimeter.

Obviously, the manometer may be employed in measuring pressures due to either vapors or gases or a mixture of the two. Furthermore, because of the optical lever, continuous changes in pressure may be readily followed and, if desired, may be recorded by means of a suitably moving photographic arrangement.

As many changes, both in the construction of the main body of the manometer, the construction of the optical lever and the manner of mounting it, may be made and may be found, in further practice, to be desirable, I wish it understood that no limitations, other than those set forth in the claims are to be imposed upon my invention.

I claim as my invention:

1. In a U-shaped mercury manometer, a light-reflecting member mounted for tilting movement and means, operable by changes in level of the mercury in the manometer, for causing proportionate tilting of the reflecting member.

2. The combination with a mercury manometer, of a support disposed in one side of the manometer, a lever pivotally carried by the support and operatively engaging the mercury surface therein and a mirror carried by the lever.

3. The combination with a mercury manometer, of a support disposed therein, a mirror pivotally mounted in the support and a float operatively connected to the mirror and engaging the surface of the mercury in the manometer, whereby changes in mercury level will cause tilting of the mirror.

4. The combination with a mercury manometer, of a support disposed in one side of the manometer and including spaced pivot eyes, a member disposed between the eyes and having knife-edge trunnions engaging in the eyes, a lever arm projecting forwardly from the lower edge of such member, a float fixed to the free end of the lever arm and a mirror carried by the member.

In testimony whereof I have hereunto subscribed my name this 26th day of Dec., 1917.

JAMES E. SHRADER.